Dec. 5, 1933.    H. FORD    1,937,950
REAR AXLE CONSTRUCTION
Filed Oct. 1, 1932
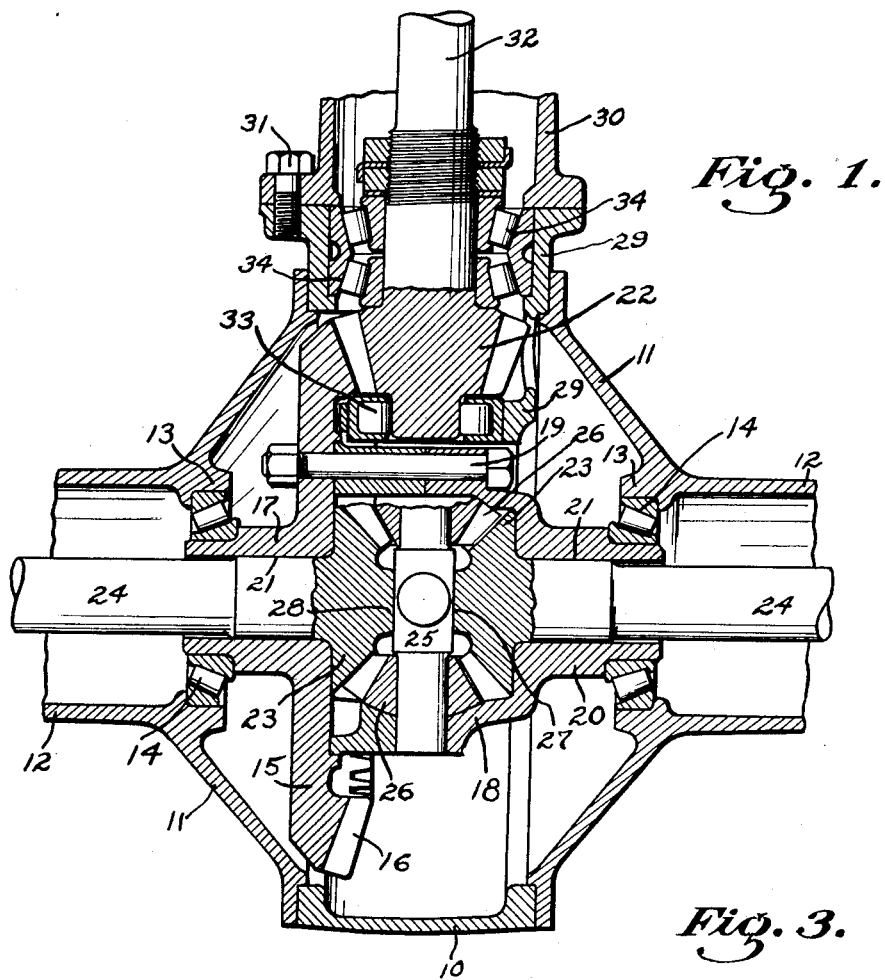
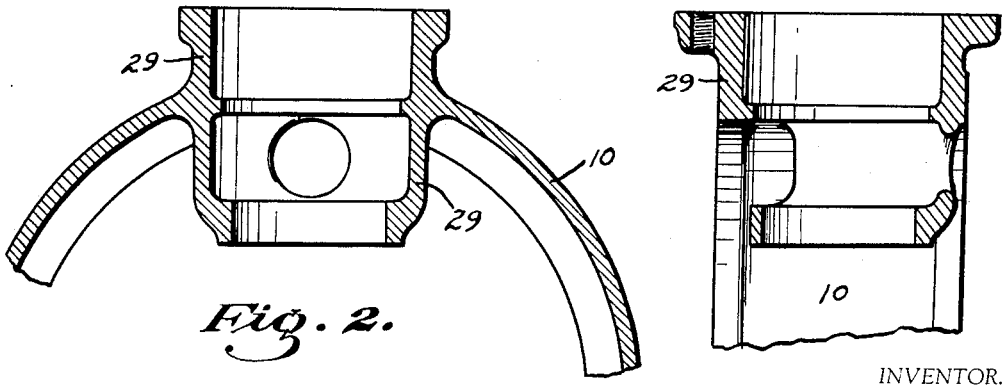
INVENTOR.
Henry Ford
BY
ATTORNEY.

Patented Dec. 5, 1933

1,937,950

UNITED STATES PATENT OFFICE 1,937,950

REAR AXLE CONSTRUCTION

Henry Ford, Dearborn, Mich., assignor to Ford Motor Company, Dearborn, Mich., a corporation of Delaware Application October 1, 1932. Serial No. 635,714

1 Claim. (Cl. 74—99)

The object of my invention is to provide an automobile axle construction of simple, durable, and inexpensive construction.

A further object of my invention is to provide an axle for use in automobiles wherein the engine torque is transmitted by a horizontal drive shaft from which the torque is conducted through a beveled pinion, ring gear and differential to the two driving wheels of the vehicle.

Particularly, my invention relates to an improved method of supporting the driving pinion and centering the bevel ring gear in the axle housing so that quieter operation, longer life and a greater factor of safety result. In the conventional axle structure, a differential housing is rotatably mounted in the central portion of the axle housing. A ring gear comprising a relatively narrow steel ring has heretofore been bolted to the periphery of such differential housing so that the alignment and concentricity of the ring gear depends upon the accuracy with which both the differential housings and the ring gear are machined. Further, this construction depends upon the differential housing retaining its original shape to maintain the correct alignment of the ring gear. A major disadvantage inherent in the conventional structure just described is that the ring gear is centered in the axle housing by means of the differential housing so that inaccuracies in machining or warpage of the differential effect the alignment of the ring gear.

In the applicant's device this disadvantage is overcome by providing a disc-shaped gear in place of the conventional ring gear, which disc has a hub formed integrally therewith upon which the gear is rotatably mounted in the axle housing. Thus, the alignment of the gear in the housing is maintained independently of the accuracy with which the differential housing is machined.

Still a further object of my invention, and perhaps of greatest importance, is the means provided for mounting the driving pinion of the axle so as to relieve all bending stresses from the pinion shaft. It is the usual practice to rotatably mount the pinion on only one side thereof so that the radial thrust must be resisted by the rigidity of the pinion shaft. It is true that attempts have been made to support the pinion shaft on both sides of the pinion but because of the following reasons this extra support has accomplished little or nothing and does not increase the permissible power which the axle may carry. Consequently, such construction has had very little application.

The pinion shaft to transmit the driving torque must be a considerable size and consequently, the lateral deflection of the shaft due to the tooth thrust is very little. In fact, on the ordinary car axle the small end of the pinion shaft can deflect only one or two thousandths of an inch before the shaft is stressed beyond its elastic limit so that if further deflection is impressed the shaft is bound to break. It follows, therefore, that any support for rotatably mounting the inner end of the pinion shaft must have greater rigidity than the pinion shaft, as otherwise such support will not be stressed with the load until after the shaft breaks. Such a support is, of course, of no value in preventing breakage of the pinion shaft. All of the structures known to the applicant wherein such a bearing was provided were constructed with an inherent rigidity less than the pinion shaft associated therewith so that in actual practice they did not increase the factor of safety of the axle and were practically useless. Either the bearing support was bolted to the housing or cast of such a light section that it would not be stressed by the permissible bending movement of the pinion shaft.

The applicant has overcome this defect by casting a sleeve integrally with his axle housing and providing bearings in each end of the sleeve to rotatably mount the pinion shaft, the pinion itself being placed between the two bearings. As this sleeve is over twice the diameter of the pinion shaft, it has almost four times the rigidity of the shaft so that it will be stressed prior to the stressing of the pinion shaft and thus carry the major portion of the radial load.

With these and other objects in view, my invention consists in the arrangement, construction and combination of the various parts of my improved device, as described in the specification, claimed in my claim, and illustrated in the accompanying drawing, in which:

Figure 1 shows a sectional view through my improved differential, ring gear, pinion and axle housing construction.

Figure 2 shows a fragmentary view in section of my improved pinion-supporting sleeve, and Figure 3 shows a view similar to Figure 2, but taken at right angles thereto.

Referring to the accompanying drawing, I have used the reference numeral 10 to indicate generally a ring of channel-shaped section which comprises the body portion of my rear axle housing. This type of axle housing is known as the "drum type," there being a pair of flanges 11 bolted to the respective heads of the housing which flanges are formed integrally with sleeves 12, the latter extending outwardly to support the vehicle wheels. Aligned with and extending inwardly from each sleeve 12 I have provided a bearing seat 13 in which a roller bearing 14 is mounted. The bearings 14 are spaced a considerable distance apart so as to rotatably mount the ring gear and differential unit of the axle. The general construction of this housing is shown in my United States Patent No. 1,692,932.

In this improved device the bevel driving gear, instead of being formed as a ring gear, is constructed as a disc 15 the periphery of which is provided with a plurality of teeth 16. A hub 17 extends axially from the center of the disc 15 and is supported in the adjacent bearing 14 thereby permanently and accurately concentrically aligning the gear teeth 16 in the housing. It will readily be seen that inasmuch as the hub 17 may be machined or turned simultaneously with the forming of the disc 15, exact concentricity of the gear is readily obtained. Further, the gear and sleeve being forged integrally, warping from aging is eliminated so that the concentricity of the gear is easily permanently maintained.

I have provided a two-part differential housing 18 which when assembled forms a cup-shaped member adapted to be bolted to the inside face of the disc 15 by a plurality of bolts 19. The bottom of this cup-shaped member 18 is provided with a hub 20, similar to the hub 17 and axially aligned therewith, which hub is mounted in the remaining bearing 14. The chamber formed within the cup-shaped member 18 is arranged to house the differential gearing of the unit.

My differential is constructed of the four-pinion type, although a two or three-pinion differential or any other type may be readily provided therewith if desired. Each of the hubs 17 and 20 is provided with an annular bearing 21 therein in which a shaft 24, formed integrally with a bevel differential gear 23, is rotatably mounted. The gears 23 are oppositely faced within the housing 18 so that the axle shafts 24 extend outwardly through the bearings 14 to position wherein the driving wheels of the vehicle are secured thereto. It will be apparent that no difficulty arises in assembling the shafts 24 and integral gears 23 in the housing 18 when the disc 15 is removed from the differential unit. The housing 18 is diametrically split at a point centrally located between the two gears 23, the coacting faces of these two members being notched to receive a spider 25. In the four-pinion type of differential shown, four arms are provided on the spider 25 and a pinion 26 is rotatably mounted on each of these arms so as to mesh with each of the gears 23. The center portion of the spider 25 is provided with a pair of machined faces 27 and a boss 28 formed integrally with each of the gears 23 butts against these faces, whereby axial movement of the gears 23 is prevented independently of their contact with the pinions 26.

From the foregoing it will be seen that I have provided a gear and differential unit which is supported by a disc directly from the bearing in the axle housing and which gear is adapted to support one side of the differential housing. It will be further noted that this gear is centered so that even should the differential housing tend to warp this will not affect the concentricity of the gear. A further advantage resulting from this construction arises because the pinions 23 may be formed integrally with the axle shafts thereby eliminating the splined driving connections usually provided in such axles.

Referring now to the means whereby the driving pinion of the axle is mounted, it will be seen that an opening is provided through one portion of the housing 10 through which the driving pinion is inserted into the housing. This opening specifically comprises the bore in a sleeve 29 which is cast integrally with the housing 10 so as to extend radially therefrom. One end of the sleeve projects inwardly from the periphery of the housing while the other end projects about an equal distance outwardly from said periphery. A torque tube 30 is secured to the outer end of the sleeve 29 by means of a plurality of bolts 31.

In the extreme inner end of this sleeve 29, I have provided a roller bearing 33. This bearing 33 is disposed concentric with a pair of bearings 34 which are mounted in the outer end of the sleeve 29. The driving pinion used in this axle is given the reference numeral 22 and is forged integrally with a drive shaft 32, this shaft being mounted between the bearings 33 and 34 so that the pinion 22 is located between these bearings. The sleeve 29 is provided with an opening in one side thereof adjacent to the teeth of the pinion and the whole proportioned so that the pinion meshes with the driven gear teeth 16. Inasmuch as the sleeve 29 is formed integrally with the periphery of the housing 10, the bending load on the pinion is rigidly resisted by this sleeve. Heretofore overhanging bearings, as the bearing 33 is sometimes called, have been provided but in all cases known to the applicant such bearings are supported in the housing in a manner less rigidly than the pinion shaft thereby making the bearing of little or no use in the supporting of such pinion. Unless the bearing is supported with a greater rigidity than is possessed by the pinion shaft itself, there is no advantage in providing the overhanging bearing.

Among the many advantages of my improved device, it may be well to mention that the means for maintaining the concentricity of the large bevel gear in the housing is of particular importance. Further, my improved structure readily permits the use of integral differential driving gears and axle shafts thereby not only lessening the cost of the structure but adding materially to the reliability thereof. Still further, an outstanding difference between this structure and all types of rear axles known to the applicant arises because of the unique integral sleeve structure used to support the inner end of the driving pinion, which sleeve possesses a greater rigidity than the pinion shaft and thereby materially assists in carrying the bending load on the pinion.

Some changes may be made in the arrangement, construction and combination of the various parts of my improved device without departing from the spirit of my invention and it is my intention to cover by my claim such changes as may reasonably be included within the scope thereof.

I claim as my invention:

A vehicle axle construction comprising, an axle housing having a pair of aligned bearings therein, an annular disc having a concentric integral hub rotatably mounted in one of said bearings, bevel gear teeth machined in the periphery of said disc, a cup-shaped differential housing having its rim secured to said disc and having a concentric hub extending from the bottom thereof rotatably mounted in the other of said bearings, a sleeve formed integrally with said axle housing and extending radially therefrom in position spaced between said housing bearings, the ends of said sleeve being spaced respectively inwardly from and outwardly from the periphery of the axle housing, a bearing in each end of said sleeve, and a pinion shaft rotatably mounted in said sleeve bearings, said shaft having a driving pinion thereon located between said sleeve bearings and said sleeve having an opening in one side thereof adjacent to said pinion, whereby said pinion will mesh with the teeth on the periphery of said disc and be rigidly supported in said housing.

HENRY FORD.